(12) United States Patent
Menaldo et al.

(10) Patent No.: US 11,747,503 B2
(45) Date of Patent: Sep. 5, 2023

(54) STEERING WHEEL HANDS ON/OFF DETECTION SYSTEM

(71) Applicants: KEY SAFETY SYSTEMS, INC., Auburn Hills, MI (US); Lorenzo Menaldo, Lugagnano (IT); Luigino Gugole, Tregnago (IT); Valerio Poli, Villa Bartolomea (IT)

(72) Inventors: Lorenzo Menaldo, Lugagnano (IT); Luigino Gugole, Tregnago (IT); Valerio Poli, Villa Bartolomea (IT)

( * ) Notice: Subject to any disclaimer, the term of this patent is extended or adjusted under 35 U.S.C. 154(b) by 520 days.

(21) Appl. No.: 16/640,402

(22) PCT Filed: Aug. 29, 2018

(86) PCT No.: PCT/IB2018/056572
§ 371 (c)(1),
(2) Date: Feb. 20, 2020

(87) PCT Pub. No.: WO2019/043586
PCT Pub. Date: Mar. 7, 2019

(65) Prior Publication Data
US 2020/0363552 A1 Nov. 19, 2020

(30) Foreign Application Priority Data
Aug. 30, 2017 (IT) .................. 102017000097665

(51) Int. Cl.
*G01V 3/00* (2006.01)
*B60R 16/027* (2006.01)
*B62D 1/06* (2006.01)

(52) U.S. Cl.
CPC .............. *G01V 3/00* (2013.01); *B60R 16/027* (2013.01); *B62D 1/06* (2013.01)

(58) Field of Classification Search
CPC ....................................................... B62D 1/06
See application file for complete search history.

(56) References Cited

U.S. PATENT DOCUMENTS

| 2011/0121618 A1* | 5/2011 | Fischer | B60N 2/002 297/180.12 |
| 2012/0326735 A1 | 12/2012 | Bennett et al. | |
| 2015/0102024 A1* | 4/2015 | Barfuss | B62D 1/046 219/204 |

FOREIGN PATENT DOCUMENTS

| EP | 3002176 A1 | 4/2016 |
| WO | 2007089655 A1 | 8/2007 |

OTHER PUBLICATIONS

International Search Report and Written Opinion in PCT/IB2018/056572. dated Nov. 7, 2018. 11 pages.

(Continued)

*Primary Examiner* — Vicky A Johnson
(74) *Attorney, Agent, or Firm* — Meunier Carlin & Curfman LLC (57) ABSTRACT

A system (1) and a method provide for detecting the presence or the absence of a hand on a steering wheel (9) that is provided with one or more conductive wires (2, 2a, 2b, 3), and the system (1) includes a detection device (5) with an input circuit (6) providing an input signal (11) to at least one conductive wire (2, 2a). The input signal (11) is an RF frequency electrical signal and an output circuit (7) is configured for sensing the impedance of the at least one conductive wire (2) or for sensing the inductive coupling between the at least one conductive wire (2a) and at least one second conductive wire (2b) in response to the input signal. The detection device (5) is configured for detecting a change in impedance of the at least one conductive wire (2, 2b) or for detecting a change the inductive coupling between the at least one conductive wire (2a) and the at least one second conductive wire (2b), to indicate the presence or the absence of a hand on said steering wheel (9).

14 Claims, 6 Drawing Sheets

(56) References Cited

OTHER PUBLICATIONS

Communication pursuant to Article 94(3) in connection to EP Application No. 18 779 023.3, dated Apr. 7, 2021.

\* cited by examiner

STEERING WHEEL HANDS ON/OFF DETECTION SYSTEM

CROSS REFERENCE TO RELATED APPLICATIONS

This application claims priority to and is a United States National Phase Patent Application of International Patent Application Number PCT/IB2018/056572, filed on Aug. 29, 2018, which claims priority to Italian Patent Application No. 102017000097665, filed on Aug. 30, 2017, both of which are incorporated by reference as if set forth fully herein.

TECHNICAL FIELD

The present invention relates to detection systems in the automotive field. In particular, the present invention relates to a system, and a method, for detecting the engagement, i.e. the contact of a hand with a steering wheel. In the general, the system and method according to the invention allows the detection of the presence or lack of a hand on a steering wheel. In the following the detection of the presence of a hand, or lack thereof, on a steering wheel will be also indicated as hand on/off detection.

BACKGROUND

Modern automotive vehicles, such as cars, are provided with Advanced Driver Assist Systems (known in the automotive field as ADAS) to increase the car safety and/or to assist the driver. These systems can provide ways of ascertaining the degree of driver's attention while driving the vehicle.

For this purpose, systems for detecting the presence of the driver's hands on or off a steering wheel, the so-called Hands Off Detection or Hands On Detection (HOD) systems, are known. HOD systems usually comprise a capacitive sensor (formed by a conductive member) arranged along the rim of a steering wheel. The capacitive sensor is configured to produce a signal that changes if one or both hands of the driver are touching the steering wheel's rim. In particular, the engagement, i.e. the contact of the driver's hand or hands with the conductive member of the capacitive sensor causes an increasing of the parasitic capacitance of the conductive element that can be detected by a sensing circuit configured to evaluate the capacitance of the conductive element. On the basis of the signal measured by the capacitive sensor, a feedback signal can be provided to advise the driver (e.g. acoustic warnings, visual signals, steering wheels vibrations, etc.).

HOD system based on capacitive sensing are typically produced with a structure formed by a plurality of layers of different materials which leads to thickness in the range between 2 mm and 2.7 mm. This structure makes the HOD systems anti-aesthetics and requires often high efforts to minimize the defects with consequent high production costs of the finished steering wheel.

Other drawbacks of known capacitive HOD systems are the reduction of detection sensibility when the driver wears thick gloves and also the false detection of the hands on the steering wheel for example when a driver is out of condition, for example in case of illness, and get in touch with another part of his body on the steering wheel.

In view of above, improved systems for detecting the presence or the absence of a hand on a steering wheel, are needed.

An object of an embodiment of the present invention is to overcome the drawbacks of the known detection system (HOD) briefly discussed above and to provide a system for the hand(s) on/off detection on a steering wheel that is simple to produce and more reliable with respect to the known HOD systems.

A further object of the present invention is to provide a hand on/off detection system reducing false hand on detection, for example due to safety reasons, e.g. if the driver collapses and get in touch with his body on the steering wheel.

A further object of the present invention is to provide a method and a system for detecting the presence or the absence of a hand on a steering wheel with an improved sensibility allowing to detect the presence or the absence of a hand on a steering wheel also when the driver wears thick gloves.

Still another object of the present invention is to provide a system and a method for detecting the presence or the absence of a hand on a steering wheel that also allow the steering wheel heating while the detecting the presence of the driver's hands.

SUMMARY OF THE INVENTION

These and other objects are achieved by means of a system according to claim 1, and by a method according to claim 10. Preferred aspects of the invention are recited in dependent claims.

According to an embodiment of the present invention, a system for detecting the presence (i.e. engagement, contact) or the absence (i.e. the lack) of a hand on a steering wheel uses a steering wheel with at least one conductive wire (e.g. at least one conductive coil) which optionally can be used to heat the steering wheel. According to an embedment, the detection system of the present invention can be installed on a steering wheel provided with conductive wires preferably wound for forming a coil or in the shape of a solenoid. Preferably, the conductive wires can be arranged under an external layer (e.g. a leather layer) of the steering wheel, for example wound as a coil having a shape of helix surrounding the armature of the steering wheel (i.e. wound around a winding axis substantially coincident with the longitudinal axis of the armature).

In other words, according to an embodiment, the steering wheel may comprise a core structure (for example having a substantially circular rim shape) and at least one conductive wire coupled to, or wound on, the core (e.g. the armature) of the steering wheel forming a sort of electromagnetic induction winding or coil.

According to another embodiment, the conductive wires can be arranged under an external layer (e.g. a leather layer) of the steering wheel wound around a winding axis different from, and preferably spaced from, the longitudinal axis of the armature (i.e. the coil is externally arranged with respect to the armature and the armature is not passing inside the coil windings).

According to an embodiment, the conductive wire/wires can be located between two different layers of foamed material (for example polyurethane foam) surrounding the armature. The foamed material can be used to form the shape of the wheel.

According to an aspect, by supplying a voltage to the conductive wire, preferably by means of a power supply unit (e.g. a PWM power supply unit), the conductive wire, and consequently the steering wheel, can be heated by Joule effect at a desired temperature set, for example by adjusting the duty cycle of the PWM power supply unit.

The system comprises a detection device having an input circuit for providing an input signal to the at least one conductive wire of the steering wheel. The input signal is an electrical signal (i.e. a voltage signal or a current) having a frequency comprised in the Radio Frequency (RF) range. The detection device comprises an output circuit for sensing the impedance of the at least one conductive wire in response to the input signal or for sensing the inductive coupling between at least one conductive wire and at least one second conductive wire in response to said input signal.

According to an aspect, the system comprises a switch assembly for selectively connecting at least one conductive wire to a PWM power supply unit (for heating the steering wheel) or to the detection device. In particular, the switch assembly is configured to connect at least one conductive wire to the detection device during the OFF period of the PWM power supply unit. A change in value of the impedance of the conductive wire, sensed by the output circuit of the detection device, is indicative of the presence or the absence of a hand on the steering wheel (hands on/hands off).

In other words, the impedance of the conductive wire is influenced by the presence (and the absence) of a hand on (and hand off) the steering wheel. Advantageously, the Applicant observed that by providing an input signal having a frequency comprised in the RF range to the conductive wire, the sensibility of the impedance sensed on the conductive wire is improved. In view of this aspect of the invention detection of the presence or the absence a hand on a steering wheel can be carried out in a reliable manner also when the driver wears thick gloves.

In the general, the term "impedance" means the measure of the opposition that a circuit presents to a current when a voltage is applied. In the present application, "impedance of a conductive coil" is meant as a measure proportional to the resistance and to the reactance of the conductive coil.

If heating of the steering wheel is required, according to an aspect, the switch assembly connects the conductive wire with the PWM power supply unit during the ON period of the PWM power supply unit. During the ON period of the PWM power supply unit, the detection circuit is preferably electrically disconnected from the conductive wire of the steering wheel. As a result, a steering wheel provided with a conductive wire can be used both for heating the steering wheel and/or for detecting the presence or the absence of a hand on the steering wheel.

Preferably, the input signal has a frequency comprised between 100 kHz and 100 MHz, more preferably between 1 MHz and 10 MHz.

According to an aspect of the present invention, the input signal has a frequency substantially equal to the resonance frequency of the conductive wire.

According to an aspect, the steering wheel comprises a plurality of conductive wires.

Advantageously, the conductive wires can be arranged at different regions of the steering wheel for detecting the presence or the absence of the hands (or other human body part) at different regions of the steering wheel (for example two conductive wires arranged at two half-regions of the steering wheel or more than two conductive wires preferably arranged uniformly in a row around the rim of the steering wheel). Thanks to this aspect, in the case of a collapsed driver on the steering wheel, the system can detect the presence of a human body part of the driver on a wide region of the steering wheel or in more points of the steering wheel contemporarily, identifying an unsafe situation and in general a detection of a contact with the steering wheel that is not corresponding, or not indicative, of a normal contact of a hand or both hands with the steering wheel.

According to an aspect, a plurality of conductive wires comprises a first conductive wire, configured to be connected to the input circuit of the detection device, and at least one second conductive wire, configured to be connected to the output circuit of the detection device. The first conductive wire is arranged to be inductively coupled to at least one second conductive wire, so that the output circuit provides an output signal indicative of the voltage induced to the second conductive wire(s) by the first conductive wire.

According to an aspect, the steering wheel comprises a plurality of conductive wires and the switch assembly is configured for selectively connect one or more conductive wires to a power supply, e.g. to a PWM power supply unit, or to the detection device. In some embodiments the output circuit is configured to be connected to at least one conductive wire for providing a resonant circuit. In this case, the output circuit of the detection device is configured to provide an output signal indicative of the oscillation frequency of the resonant circuit. The frequency of the resonant circuit is in turn indicative of the impedance of the conductive wire connected to the output circuit. By monitoring the oscillation frequency of the resonant circuit, the impedance of the conductive wire can be sensed and the presence or the absence of a hand on the steering wheel can be detected as a change in value of the impedance of the conductive wire.

A further object of the present invention is a method for detecting the presence or the absence (i.e. the engagement or the disengagement) of a hand on a steering wheel having one or more conductive wires. As already mentioned above in connection to the system, the one or more conductive wires can be used for heating the steering wheel. The method comprises the steps of:

a) providing an input signal to at least one conductive wire, wherein said input signal is an electrical signal having a frequency comprised in the RF range;

b) sensing the impedance of the at least one conductive wire or sensing the inductive coupling between the at least one conductive wire and at least one second conductive wire;

c) detecting a change in value of the impedance of the at least one conductive wire or detecting a change in value of the inductive coupling between the at least one conductive wire and the at least one second conductive wire, that is indicative of the presence or the absence of a hand on the steering wheel.

According to a preferred aspect of the present invention the method comprises a further step d) of heating the one or more conductive wires by means of a PWM power supply unit, wherein the steps a), b) and c) are carried out during the OFF period of the PWM power supply unit.

An alternate embodiment of the method according to the present invention can provide that step b) is carried out by connecting one or more conductive wires to an output circuit of the detection device for providing a resonant circuit, wherein the step c) is carried out by monitoring the oscillation frequency of the resonant circuit.

In the case of a steering wheel provided with a plurality of conductive wires, another embodiment of the method according to the present invention can provide that step a) is carried out preferably using a first conductive wire of the plurality of conductive wires, step b) is carried out to at least one second conductive wire of the plurality of conductive wires, wherein the first conductive wire is arranged to be inductively coupled to the at least one second conductive wire, so that the step c) is carried out by monitoring the voltage induced to the at least one second conductive wire by the first conductive wire. In particular, the input signal provided to the first conductive wire generates an electromagnetic field that in turn generates (by electromagnetic induction) an induced voltage in the second conductive wire. By monitoring the voltage induced to the second conductive wire, the presence (engagement) or not of a hand on the steering wheel can be detected as a change in value of induced voltage in the second conductive wire that is indicative of the impedance of the first conductive wire.

The invention also relates to a steering wheel comprising a detections system herein disclosed and/or claimed.

BRIEF DESCRIPTION OF THE DRAWINGS

The invention will now be described in greater detail, by way of example, with reference to the accompanying non limiting drawings. It is emphasized that, according to common practice, the various features of the drawing are not necessarily to scale.

On the contrary, the dimensions of the various features are arbitrarily expanded or reduced for clarity. Like numerals denote like features throughout the specification and the drawings in which.

DETAILED DESCRIPTION

Figure 1:
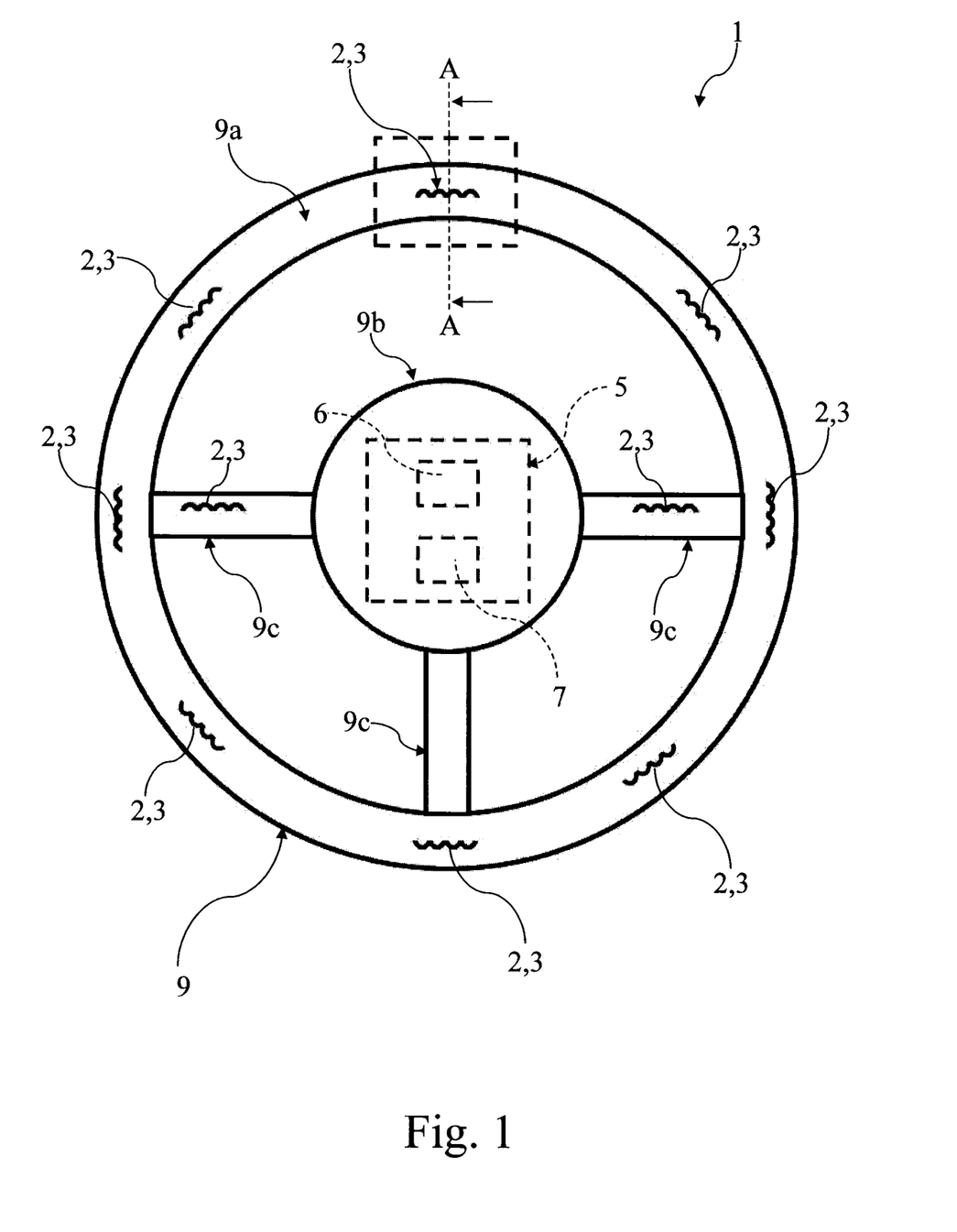
FIG. 1 schematically shows a system for detecting the presence or the absence of a hand on a steering wheel according to an embodiment of the present invention.

With reference to FIG. 1, an embodiment of a system 1 for detecting the engagement of a hand with a steering wheel 9 is shown. In particular, the steering wheel 9 is provided with one or more conductive wires 2, 3. The steering wheel 9 is typically provided with a rim 9a, a hub 9b and a plurality of spokes 9c. The conductive wires 2 and 3 are placed at selective locations of the rims and/or spokes.

The system 1 comprises a detection device 5 configured for detecting a change in value of the impedance of one or more conductive wires 2 that is indicative of the engagement or not of a hand with the steering wheel 9.

The detection device 5 (schematically shown as a rectangle in phantom line in FIG. 1) can be arranged within the steering wheel 9 (for example within the hub 9b) or externally. The detection device 5 comprises an input circuit 6 for providing an input signal 11 to at least one conductive wire 2 and an output circuit 7 for sensing the impedance of the conductive wire in response to the input signal.

Preferably, the conductive wires 2, 3 are wound around a winding axis to form solenoids, or in general coils wound into a helix, symbolically indicated as inductors.

Figure 2A:
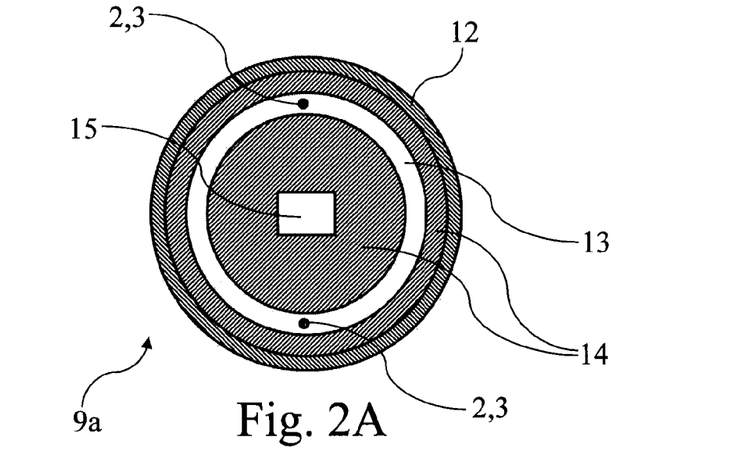
FIG. 2A is a cross section through the cutting plane A-A shown in FIG. 1 of a steering wheel rim in an embodiment according to the present invention.

Referring to FIG. 2A, conductive wires 2, 3 can be arranged for example under the external layer 12 (e.g. a leather layer) of the steering wheel 9, preferably arranged in a space 13 between the leather 12 and an inner layer 14 made of foamed material (for example PUR, EPP, EPE, EPS) or bulk material (for example TPU) which typically cover the armature 15 of the steering wheel 9.

In the embodiment shown in FIG. 2A, conductive wires 2, 3 are arranged in a space 13 between two different layers of foamed material 14, as for example disclosed in EP1305200 in the name of the Applicant.

Figure 2B:
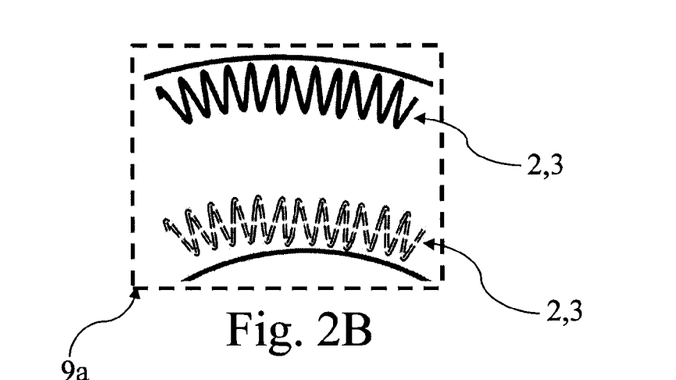
FIGS. 2B and 2C schematically show two possible arrangements of the conductive wires of the steering wheel according to the system of the present invention.
Figure 2C:
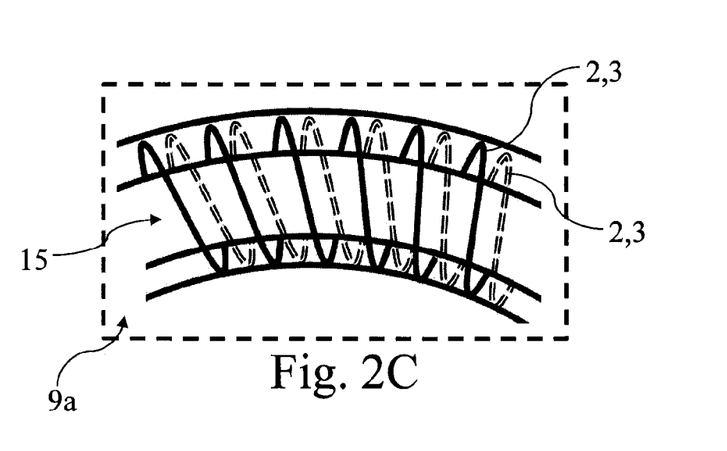

In particular, FIGS. 2B and 2C are enlarged views showing schematically the interior (i.e. the part under the external layer 12 of the steering wheel 9) of a portion of the steering wheel rim 9a enclosed in the rectangle in dotted line shown in FIG. 1.

Referring to FIG. 2B, the conductive wires 2, 3 are wound around a winding axis different from the longitudinal axis of the armature 15 of the steering wheel, so that the armature 15 is not passing within the windings of the coil. In the embodiment shown in FIG. 2C, conductive wires 2, 3 are wound around a winding axis substantially coincident with the longitudinal axis of the armature 15 of the steering wheel 9, so that the armature 15 is passing within the windings of the conductive wires 2, 3. Further embodiments can provide that the steering wheel 9 is provided with conductive wire(s) 2, 3 arranged as shown in FIG. 2B and conductive wire(s) arranged as shown in FIG. 2C.

Each conductive wire 2, 3 is preferably wound to form a coil having an inductance value comprised between about 2 mH and about 40 mH.

Figure 3:
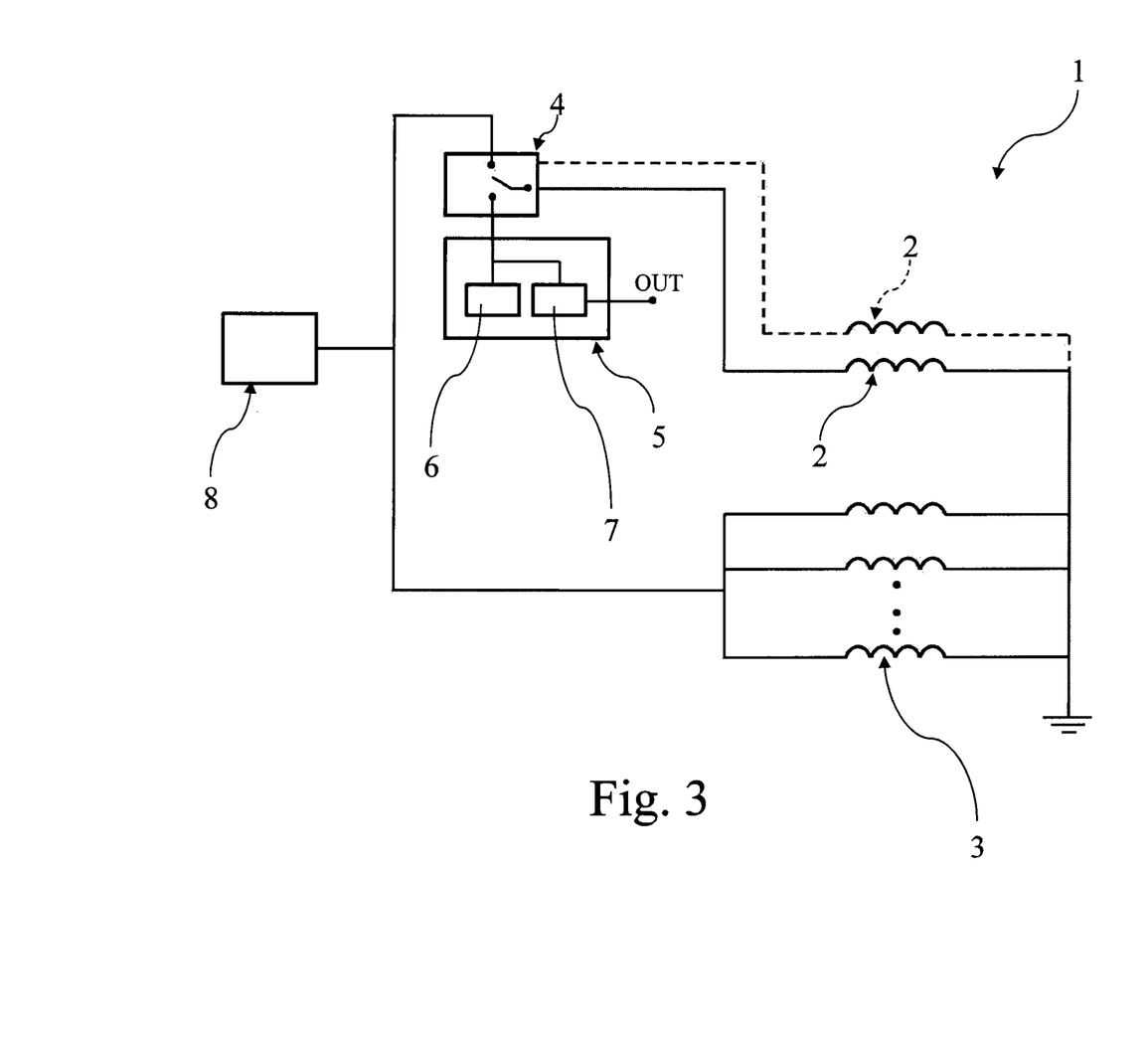
FIGS. 3, 4 and 5 are circuital schemes of possible embodiments of the system for detecting the presence or the absence of a hand on a steering wheel according to the present invention.

In the embodiment shown in FIG. 3, the steering wheel 9 is preferably provided with one or more conductive wires 3, connected to power supply unit 8 (e.g. a PWM power supply unit), and a conductive wire 2 connected to a switch assembly 4 configured to selectively connect the conductive wire 2 to said power supply unit 8 or to a detection device 5.

When a heat steering wheel is included as part of the invention, the switch assembly 4 connects the conductive wire 2 to the PWM power supply unit 8 during its ON period. In this configuration, the conductive wires 2 and 3 are connected (preferably in parallel to each other) to the PWM power supply unit 8 for heating the steering wheel 9.

Some embodiments can provide however that the steering wheel 9 has a single conductive wire 2 connected to the switch assembly 4 or that the steering wheel 9 has a plurality of conductive wires 2 each of which connected to a switch assembly 4. As can be seen in FIG. 3, an additional conductive wire is shown in phantom line connected to the switch assembly 4.

Figure 4:
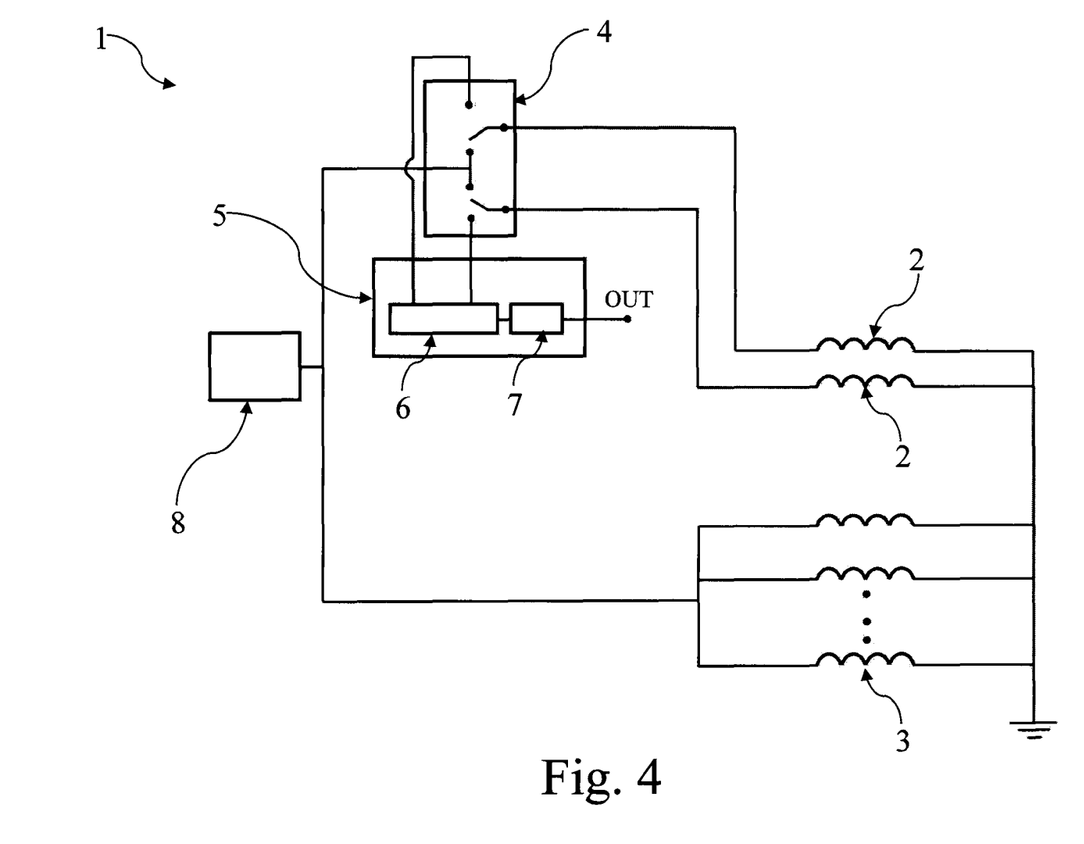

In this last case, the switch assembly 4 is preferably configured for selectively connecting the plurality of conductive wires 2 to the PWM power supply unit 8 or to the detection device 5 (as shown for example in FIG. 4). In general, the steering wheel 9 is provided with at least one conductive wire 2 configured to be connected to the PWM power supply unit or to the detection device 5 by means of the switch assembly 4.

Figure 5:
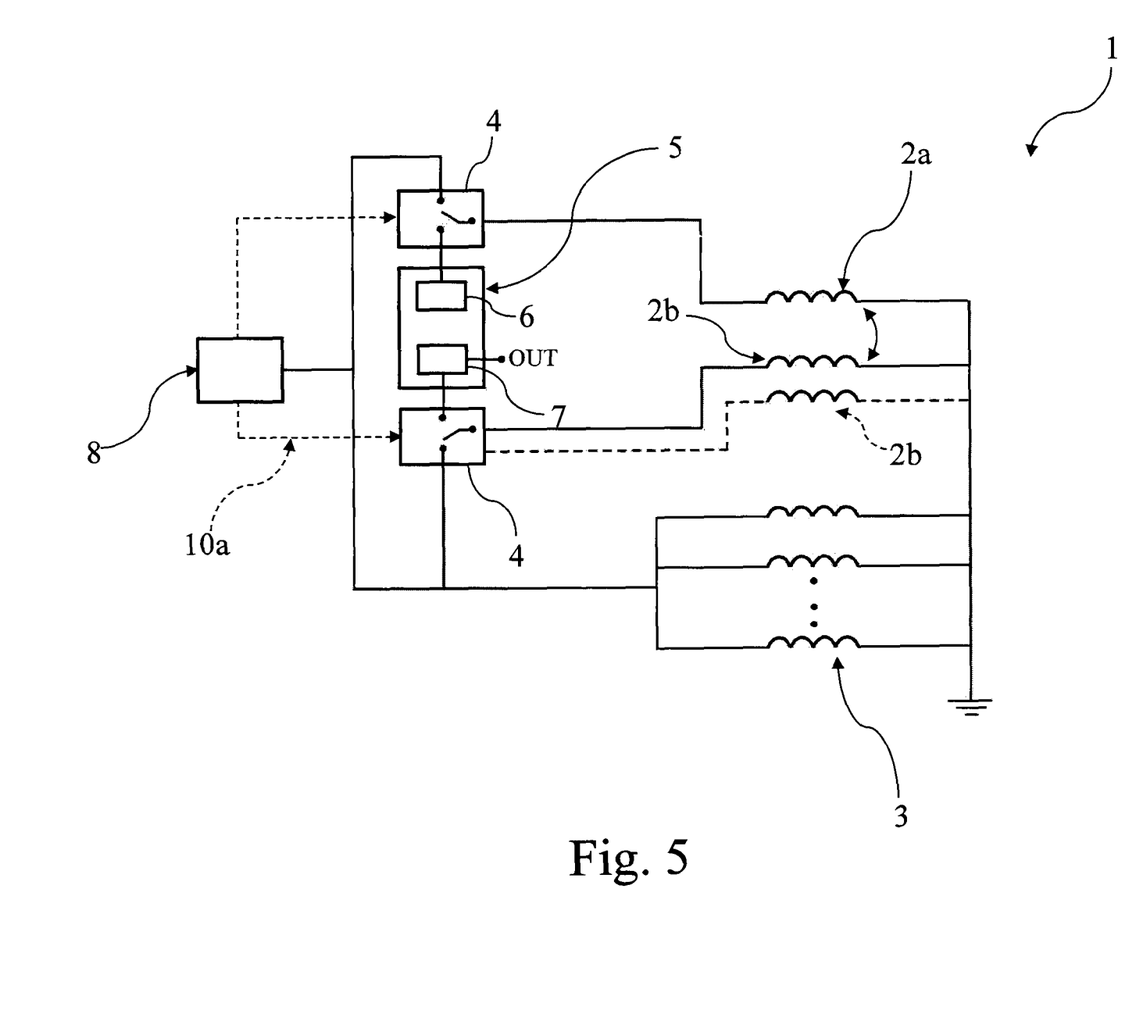
Figure 6:
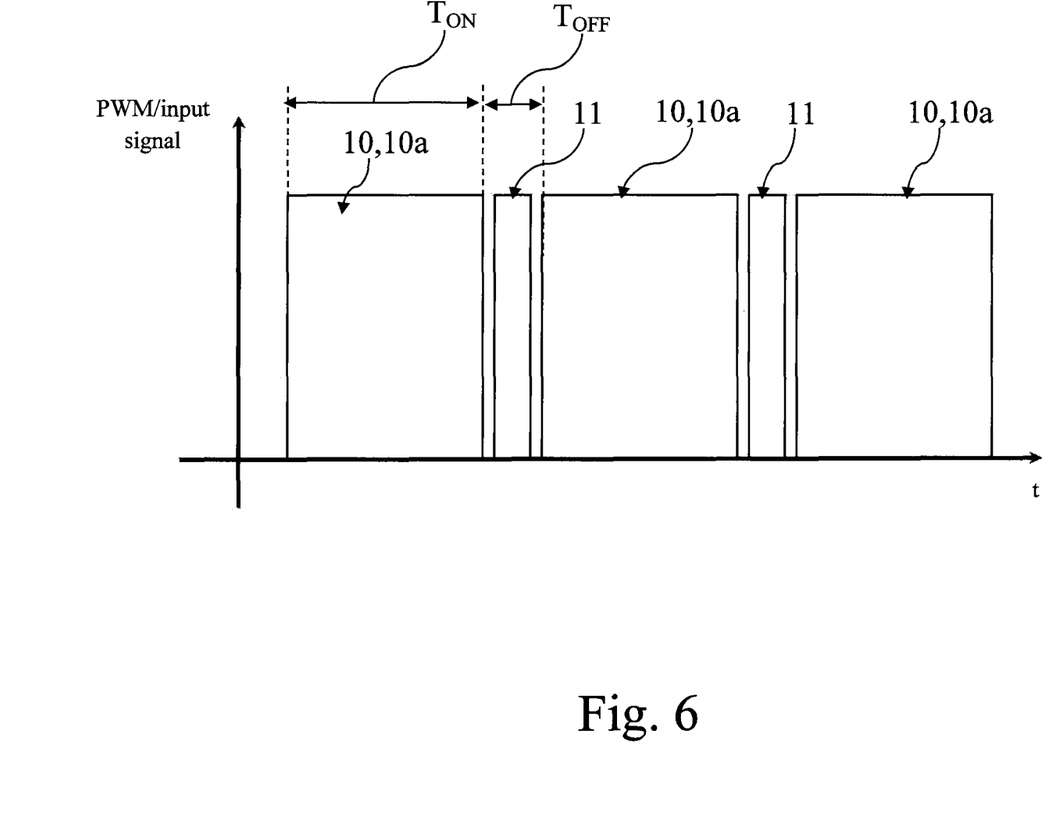
FIG. 6 shows a time graph of the PWM signal and of the input signal in the case of a heating of the steering wheel is required.

During the OFF period, see for example FIG. 6, of the PWM power supply unit 8, the switching assembly 4 connects the conductive wire(s) 2 to the detection device 5. For example, the switching assembly 4 can be controlled by a control signal that can be the PWM signal 10 of the power supply unit 8 or in general a control signal 10a substantially synchronized to the PWM power supply unit 8 (as schematically shown in dotted line in FIG. 5).

If heating of the steering wheel is not required, the ON period of the PWM power supply unit 8 is null and the switching assembly 4 keeps the conductive wire 2 connected to the detection device 5.

During the OFF period of the PWM power supply unit 8, the detection device 5 provides an input signal to the conductive wire 2 and detects a change in value of the impedance of the conductive wire that is indicative of the presence or not of a hand on said steering wheel 9. In particular, the detection device 5 comprises an input circuit 6 for providing an input signal to the conductive wire 2 and an output circuit 7 for sensing the impedance of the conductive wire 2 in response to the input signal. According to possible embodiments, microcontroller with LIN or CAN bus can be used to carry out detection.

The input signal is an electrical signal (i.e. an electrical current or a voltage) having a frequency comprised in the RF range. Preferably, the frequency is comprised between 100 kHz and 100 MHz, more preferably between 1 MHz and 10 MHz.

The input circuit 6 can comprise for example an oscillator, preferably a Voltage Controlled Oscillator (VCO) for providing an input signal at a determined frequency that can be adjusted. In particular, the input signal can be set at a frequency substantially equal to the resonance frequency of the conductive wire 2.

In the embodiment shown in FIG. 3 the output circuit 7 is configured to be connected to the conductive wire 2 for providing a resonant circuit.

The output circuit provides an output signal indicative of the oscillation frequency of the resonant circuit. For example, the detection device 5 can be an Inductance to Digital Converter (LDC) for inductive sensing. According to an embodiment, an Inductance to Digital Converter (LDC) for inductive Sensing distributed by Texas Instrument, preferably the model LDC1612 or LDC1614, can be used.

By monitoring the oscillation frequency of said resonant circuit (i.e. the output signal provided by the output circuit 7 of the detection device 5), the impedance of the conductive wire 2 can be sensed for detecting the presence or not of a hand on said steering wheel 9.

In other words, the value of the oscillating frequency of the resonant circuit of the detection device 5 is indicative of presence or not of a hand or both hands on the steering wheel 9.

In the case of a steering wheel 9 provided with a plurality of conductive wires 2, an embodiment of the present invention can provide that the conductive wires 2 are advantageously arranged at different regions of the steering wheel 9. For example, in FIG. 1, a plurality of conductive wires 2 are shown at eight regions of the rim 9a of the steering wheel 9 (every 45°). Further embodiments can provide for example that the steering wheel 9 comprises only two conductive wires 2 of which a conductive wire 2 can be arranged on the left region of the steering wheel and another conductive wire 2 arranged on the right region, so that left hand and right hand can be distinguished by the detection device 5.

With respect to FIG. 5, another embodiment of a system 1 for detecting a hand on a steering wheel 9 is shown. In this embodiment, the steering wheel 9 is provided with a plurality of conductive wires 2a, 2b, 3.

In particular, the steering wheel 9 is provided with a first conductive wire 2a configured to be connected to the input circuit 6 of the detection device 5, at least one conductive wire 2b configured to be connected to the output circuit 7 of the detection circuit 5, and one or more conductive wires 3 connected to a power supply unit 8 (e.g. a PWM power supply unit).

The first conductive wire 2a is arranged to be inductively coupled to the second conductive wire 2b, so that when an input signal (having a frequency comprised in the RF range) is provided to the first conductive wire 2a (by the input circuit 6), an induced voltage is provided to the second conductive wire 2b by electromagnetic induction.

When heating of the steering wheel is required, the switch assembly 4 connects the conductive wires 2a and 2b to the PWM power supply unit 8 during its ON period.

In this configuration, the conductive wires 2a, 2b and 3 are connected (preferably in parallel to each other) to the PWM power supply unit 8 for heating the steering wheel 9.

During the OFF period of the PWM power supply unit 8, the switching assembly 4 connects the conductive wire 2a to the input circuit 6 of detection device 5, and the conductive wire 2b to the output circuit 7 of the detection device 5.

According to this embodiment of the system 1 according to the present invention, the output circuit 7 is configured for providing an output signal indicative of the voltage induced to the second conductive wire 2b by the first conductive wire 2a.

By monitoring the voltage induced to the second conductive wire 2b, the presence or not of a hand on said steering wheel 9 can be detected.

In other words, the value of the voltage induced to the second conductive wire 2b is indicative of presence or not of a hand or both hands on the steering wheel 9. A hand, or both hands, touching the rim of the steering wheel cause a change of the inductively coupling between the first and the second conductive wire 2a, 2b with a consequent change in value of the voltage induced sensed on the second conductive wire 2b.

According to a possible embodiment, steering wheel 9 is provided with a first conductive wire 2a inductively coupled with a plurality of second conductive wires 2b. As can be seen in FIG. 5, an additional conductive wire 2b is shown in phantom line connected to the switch assembly 4. In this embodiment, the second conductive wires 2b can be advantageously arranged at different regions of the steering wheel 9.

For example a first conductive wire 2a can be arranged in a central region of the steering wheel, a second conductive wire 2b can be arranged on the left region of the steering wheel and another second conductive wire 2b arranged on the right region, so that left hand and right hand can be distinguished by the detection device 5.

Summarizing, an embodiment of the method for detecting the presence or the absence of a hand on a steering wheel according to the invention comprises the steps of:

a) providing an input signal having a frequency comprised in the RF range to a conductive wire 2, 2a;
b) sensing the impedance of the conductive wire 2 or sensing the inductive coupling between the conductive wires 2a, 2b;
c) detecting a change in value of the impedance of the conductive wire 2 or detecting a change in value of the inductive coupling between the conductive wires 2a, 2b that is indicative of the presence or absence of a hand on the steering wheel.

Preferably, the method comprises the further step of d) heating all the conductive wires 2, 2a, 2b, 3 by a PWM power supply unit 8.

With respect to FIG. 6, if a heating of the steering wheel 9 is required, the switch assembly 4 connects the conductive wire 2, 2a, 2b, 3 to the PWM power supply unit 8 during the ON period (indicated as $T_{ON}$) of the PWM power supply unit 8.

The PWM power supply unit 8 provides a DC voltage (indicated with the numeric reference 10) to the conductive wire 2, 2a, 2b, 3 for heating the steering wheel.

During the OFF period (indicated as $T_{OFF}$) of the PWM power supply unit 8, the switch assembly 4 connects the conductive wire 2, 2a, 2b to the detection device 5 for providing an input signal 11 (an electrical signal having a frequency comprised in the RF range) that can be supplied to the conductive wire 2, 2a or induced to the second conductive wire 2b.

The step b) of sensing the impedance of the conductive wire 2, 2b and step c) of detecting a change in value of the impedance of the conductive wire 2, 2b are carried out during the OFF period of the PWM power supply unit 8.

The preceding merely illustrates the principles of embodiments of the disclosure. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. This description of the exemplary embodiments is intended to be read in connection with the figures of the accompanying drawing, which are to be considered part of the entire written description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A system for detecting the presence or the absence of a hand on a steering the system comprising:
   one or more conductive wires on the steering wheel;
   a detection device comprising:
      an input circuit for providing an input signal to at least one conductive wire of said one or more conductive wires, said input signal being an electrical signal having a frequency in an RF range; and
      an output circuit configured for sensing impedance of said at least one conductive wire or for sensing inductive coupling between said at least one conductive wire and at least one second conductive wire in response to said input signal,
   said detection device being configured for detecting a respective change in value of the impedance of said at least one conductive wire or for detecting a different respective change in value of said inductive coupling between said at least one conductive wire and said at least one second conductive wire, wherein said respective change and/or said different respective change are indicative of the presence or the absence of a hand on said steering wheel;
   wherein upon said at least one conductive wire being arranged to be inductively coupled to said at least one second conductive wire, said output circuit provides an output signal indicative of a voltage induced on said at least one second conductive wire by said first conductive wire; and
   wherein said input signal has a frequency between 100 kHz and 100 MHz, inclusive.

2. The system according to claim 1, further comprising a switch assembly selectively connecting at least one conductive wire to a PWM power supply unit or to said detection device said switch assembly being configured to connect said at least one conductive wire to said detection device during an OFF period ($T_{OFF}$) of said PWM power supply unit.

3. The system according to claim 2, wherein said switch assembly connects said at least one conductive wire to said PWM power supply unit during an ON period ($T_{ON}$) of said PWM power supply unit for heating the steering wheel.

4. The system according to claim 1, wherein said input signal has a frequency substantially equal to a resonance frequency of said at least one conductive wire.

5. The system according to claim 1, wherein said steering wheel is provided with a plurality of said conductive wires wherein said conductive wires are arranged at different regions of said steering wheel.

6. The system according to claim 5, wherein said switch assembly is configured for selectively connecting said plurality of said conductive wires to said PWM power supply unit or to said detection device.

7. The system according to claim 1, wherein said output circuit is configured to be connected to said at least one conductive wire for providing a resonant circuit, said output circuit providing an output signal indicative of the oscillation frequency of said resonant circuit.

8. The system according to claim 1, wherein said input signal has a frequency between 1 MHz and 10 MHz.

9. A method for detecting the presence or the absence of a hand on a steering wheel having one or more conductive wires for heating said steering wheel said method comprising the following steps:
   providing an input signal having a frequency between 100 kHz and 100 MHz to at least one conductive wire of said one or more conductive wires said input signal being an electrical signal having a frequency in an RF range;
   sensing impedance of said at least one conductive wire or sensing inductive coupling between said at least one conductive wire and at least a second conductive wire of said conductive wires;
   detecting a respective change in value of the impedance of said at least one conductive wire or detecting a different respective change in value of the inductive coupling between said at least one conductive wire and said at least one second conductive wire wherein said respective change and/or said different respective change are indicative of the presence or the absence of a hand on said steering wheel;
   arranging said at least one conductive wire to be inductively coupled to said at least one second conductive wire; and
   providing an output signal with said output circuit, said output signal indicating a voltage induced on said at least one second conductive wire by said first conductive wire.

10. The method according to claim 9, comprising a further step of heating said one or more conductive wires by a PWM power supply unit wherein said steps of claim 9 are carried out during the OFF period ($T_{OFF}$) of said PWM power supply unit.

11. The method according to claim 9 wherein said input signal has a frequency substantially equal to a resonance frequency of said at least one conductive wire.

12. A system for detecting a presence or an absence of a hand on a steering wheel, the system comprising:
one or more conductive wires on the steering wheel;
a detection device comprising:
an input circuit providing an input signal to at least one conductive wire of said one or more conductive wires, said input signal being an electrical signal having a frequency in an RF range, and
an output circuit configured for sensing inductive coupling between said at least one conductive wire and at least one second conductive wire in response to said input signal,
said detection device being configured for detecting a change in value of said inductive coupling between said at least one conductive wire and said at least one second conductive wire that is indicative of the presence or the absence of a hand on said steering wheel.

13. A method for detecting the presence or the absence of a hand on a steering wheel having one or more conductive wires for heating said steering wheel, said method comprising the following steps:
providing an input signal having a frequency between 100 kHz and 100 MHz to at least one conductive wire of said one or more conductive wires, said input signal being an electrical signal having a frequency in an RF range;
arranging the at least one conductive wire to be inductively coupled to at least one second conductive wire;
monitoring a voltage induced on said at least one second conductive wire by said first conductive wire to sense impedance of said at least one conductive wire and at least one second conductive wire or to sense inductive coupling between said at least one conductive wire and said at least one second conductive wire; and
detecting a respective change in value of the impedance of said at least one conductive wire or detecting a different respective change in value of inductive coupling between said at least one conductive wire and said at least one second conductive wire, wherein said respective change and/or said different respective change are indicative of the presence or the absence of a hand on said steering wheel.

14. The method according to claim 13 wherein the sensing impedance comprises connecting said at least one conductive wire to an output circuit for providing a resonant circuit, and wherein said detecting a respective change in value of the impedance is carried out by monitoring an oscillation frequency of said resonant circuit.

* * * * *